United States Patent [19]

Rose et al.

[11] 3,930,550

[45] Jan. 6, 1976

[54] VEHICLE DRIVE AND SUSPENSION

[75] Inventors: Harold T. Rose, Sterling Heights; Clarence D. Gilreath, Inkster, both of Mich.

[73] Assignee: The United States of America as represented by the Secretary of the Army, Washington, D.C.

[22] Filed: Aug. 15, 1974

[21] Appl. No.: 497,772

[52] U.S. Cl. ............. 180/24.08; 115/1 R; 180/6.66; 280/124 B
[51] Int. Cl.² ......................................... B60K 17/22
[58] Field of Search ........... 180/24.08, 24.05, 24.13, 180/6.2, 6.66.6.7; 115/1 R; 280/124 B

[56] References Cited
UNITED STATES PATENTS

| | | | |
|---|---|---|---|
| 3,452,702 | 7/1969 | Slemmons | 180/24.08 X |
| 3,566,825 | 3/1971 | Ruf | 180/24.08 X |
| 3,666,036 | 5/1972 | Scerbo | 115/1 R X |

*Primary Examiner*—Robert R. Song
*Assistant Examiner*—Terrance L. Siemens
*Attorney, Agent, or Firm*—John E. McRae; Peter A. Taucher; Robert P. Gibson

[57] ABSTRACT

Disclosed is a novel vehicle suspension and drive means, comprising a drive shaft extending parallel to the longitudinal axis of the vehicle, and a torsion-transmitting suspension rod extending from a wheel road arm across the drive shaft axis. The suspension rod is specially formed with a clearance opening that accommodates the drive shaft in a non-obstructing relationship. The drive shaft transmits driving force to a drive sleeve that encircles the torsion transmitting rod. A special anti-friction bearing is provided for the drive sleeve.

9 Claims, 4 Drawing Figures

VEHICLE DRIVE AND SUSPENSION

The invention described herein may be manufactured, used, and licensed by or for the Government for governmental purposes without payment to me of any royalty thereon.

BACKGROUND AND SUMMARY

Drive arrangements are known wherein drive forces are transmitted to four of the vehicle wheels. Suspension systems are known wherein each road wheel is carried by a support arm having extensive travel for improved cushioning of the vehicle; the support arm is swingably attached to the vehicle hull. In such systems an elastic force-absorption means may be associated with each road wheel support arm to cushionably support the sprung weight of the hull.

The present invention involves the incorporation of a vehicle drive means within four or more of the swingable suspension arms, thereby obtaining the combined advantages of multi-wheel drive and long travel suspension.

THE DRAWINGS

FIG. 1 schematically shows in top plan a vehicle incorporating the invention.

FIGS. 1 AND 2 (GENERAL ARRANGEMENT)

Figure 1:
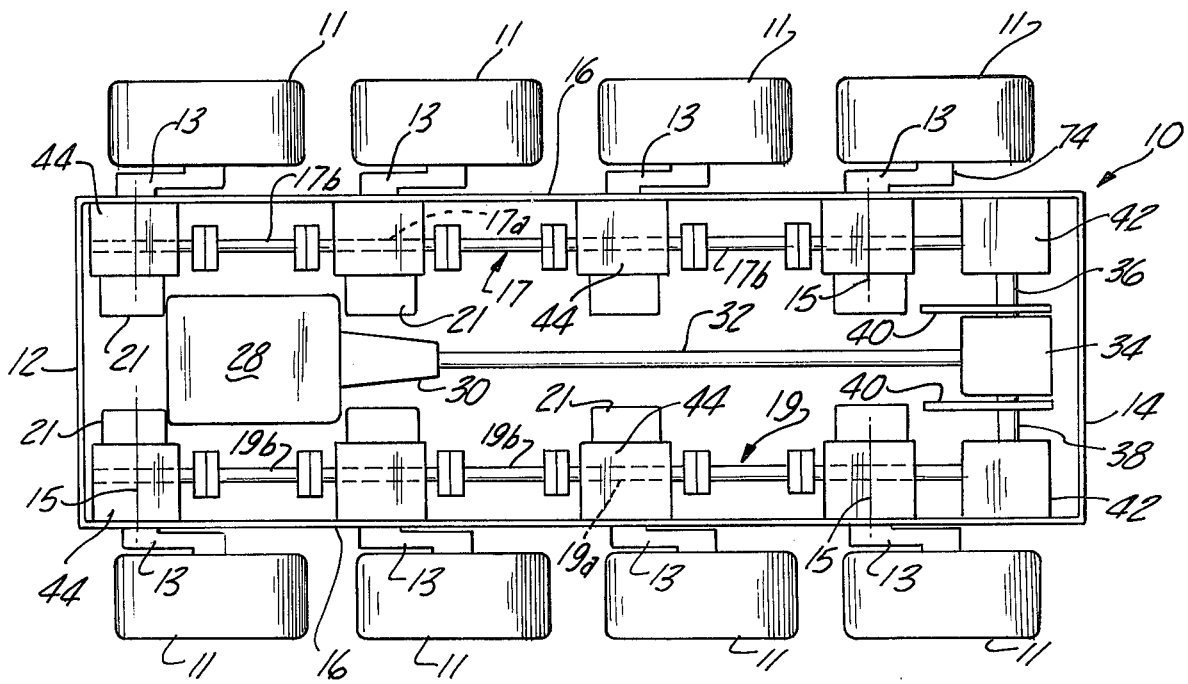
Figure 2:
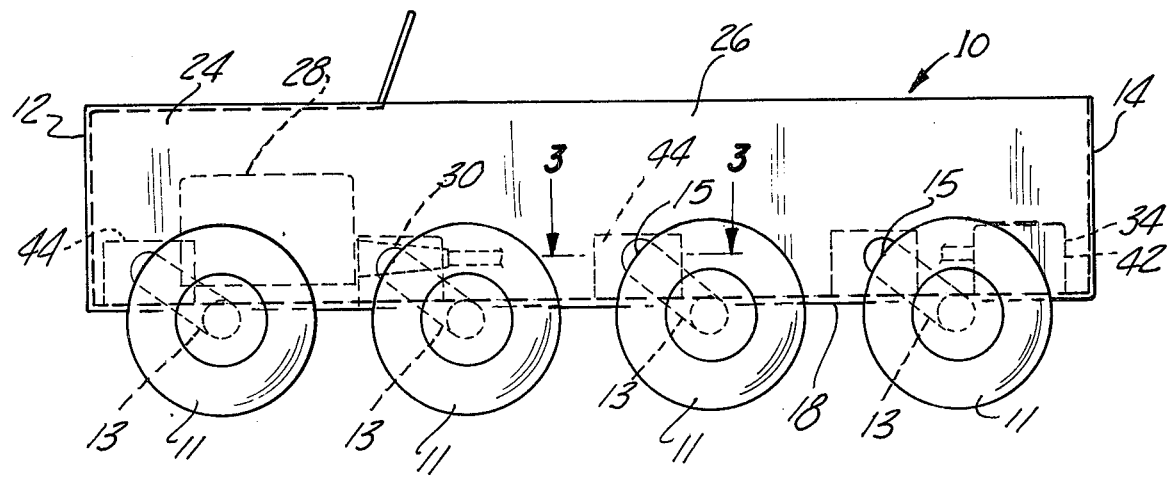
FIG. 2 is a side elevational view of the FIG. 1 vehicle.

FIGS. 1 and 2 schematically show a vehicle comprising a hull 10 having a front wall 12, rear wall 14, side walls 16 and bottom wall 18.

An internal combustion engine 28 is connected to a conventional transmission 30 for rotating the propeller shaft 32. Connected to the rear end of shaft 32 is a manually-controlled steering unit 34 having laterally-directed shafts 36 and 38 selectively or simultaneously rotatable according to the positions of manual control arms 40. Steering unit 34 is a commercially available item, for example the steer unit marketed by the Glen L. Bowen Co. of Detroit, Michigan under its designation DS-50. Other steer units are shown in U.S. Pat. Nos. 2,525,190 and 3,353,616 and 3,760,896.

Shafts 36 and 38 are connected to coventional direction-changing gear units 42 that transmit rotational power to the longitudinal shafts 17 and 19. As seen in FIG. 1, each shaft 17 or 19 is comprised of a number of flanged shaft sections 17a, 17b or 19a, 19b connected together. The sectional character of each shaft is merely for installation and service purposes; operationally each shaft 17 or 19 may be considered a single shaft. Each sectional shaft runs through four shaft housings 44 containing mechanisms for transmitting power to gear train units located in wheel support arms 13.

FIG. 3

Figure 3:
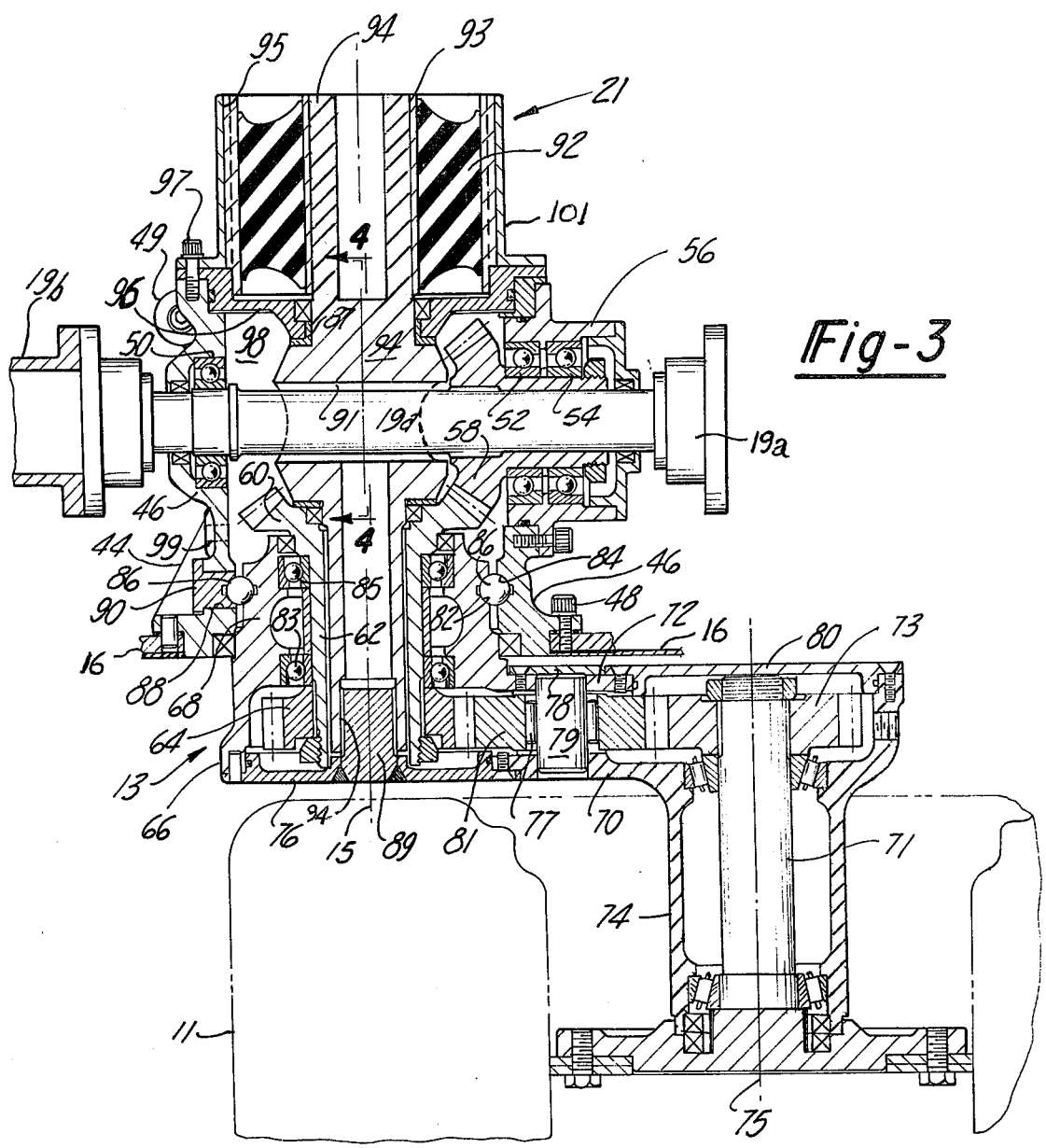
FIG. 3 is an enlarged sectional view taken through a suspension-drive unit employed in the FIG. 1 vehicle.

FIG. 3 is an enlarged sectional view taken on line 3—3 in FIG. 2, i.e., a sectional view taken on a horizontal plane at the centerline of the power shaft 19 (or 17). The shaft support housing 44 comprises a main casting 46 suitably bolted at various points 48 to the hull side wall 16. The housing is located on or directly above the hull bottom wall 18; additional bolts (not shown) run through housing flange 49 into the hull bottom wall.

The illustrated shaft section 19a (FIG. 3) is supported at spaced points in anti-friction bearings 50, 52 and 54. Bearings 52 and 54 are carried in a cage 56 suitably bolted onto casting 46. The shaft carries a bevel gear 58 that meshes with a bevel gear 60 carried by a drive sleeve 62, whose outer end carries a spur gear 64 located within road wheel support arm 13.

Arm 13 comprises a main casting 66 that defines a barrel 68 centered on swing axis 15, spaced walls 70 and 72 extending normal to the swing axis, and a tubular support wall 74 for wheel axle 71. Cover plates 76, 78 and 80 are bolted onto casting 66 to facilitate access to the various gears. Plate 76 serves also to mount a plug element 89 that is splined to a hollow rod 94.

Barrel portion 68 of the support arm is machined on its outer peripheral surface to form a semi-circular cross sectioned groove 82. A mating groove 84 is machined in the inner surface of casting 46. Anti-friction ball elements 86 are introduced into the raceway formed by the mating grooves. To facilitate introduction of the balls, the casting is formed with a ball-loader opening 88 that is subsequently closed by a plug 90. Groove 84 is machined in the casting with the plug in place; the inner end of the plug thereby constitutes part of the raceway surface. The plug is temporarily removed to load balls 86. This method of manufacture minimizes the radial thickness of barrel 68 and casting 46, thereby reducing the outside diameter of housing 44 while still having adequate space within the barrel for accommodation of drive sleeve 62. A relatively small housing O.D. is desirable to minimize the unusable vertical space within the hull. In an illustrative vehicle such unusable space is only about 9 inches.

Swinging movement of each road arm 13 about axis 15 is resiliently resisted by an elastic force-absorption means 21 comprised of an elastomeric annulus 92 bonded to sleeves 93 and 95. Sleeve 93 is keyed to a torque rod 94 that extends crosswise of shaft 19a to a connection at 89 with road arm 13. Sleeve 95 is keyed or otherwise anchored to a casing 101 that bolts onto housing 44, as at 97. Therefore swinging movement of road arm 13 about axis 15 places shearing loads on elastomeric annulus 92.

Interior space 98 is oil-filled (through a filler opening 99). To isolate elastomeric annulus 92 from the oil-filled space, there may be provided a removable end wall 96.

Wall 96 carries a sleeve bearing 87 which centers and locates torque rod 94 on swing axis 15. Torque rod 94 intersects and crosses the axis defined by shaft section 19a. However the rod and shaft do not interfere with one another because the rod is formed with a transverse clearance opening 91. Shaft section 19a can rotate freely on its axis; rod 94 can rotate to a limited extent, e.g. 66°, in the swing plane defined by axis 15. Rod 94 is designed to transmit torsion force from road wheel arm 13 to elastomeric annulus 92. The elastic annulus constitutes a torsional force-absorption element between the road arm and the hull.

Wheel-driving forces are transmitted from shaft section 19a through bevel gears 58 and 60 to a sleeve 62 that is rotatably mounted within barrel 68 by means of anti-friction bearings 83 and 85. Sleeve 62 drives gear 64 that meshes with an idler gear 81 carried on a pin 79 fixed within road arm 13; needle bearings 77 permit free rotation of gear 81 around the axis of pin 79. Gear 81 transmits rotation to another gear 73 carried on the road wheel axle 71.

In summary, each drive shaft 19a (or 17a) transmits rotation to the road wheel through a drive system consisting of gears 58 and 60, sleeve 62, gears 64, 81, and 73, and axle 71. The drive system functions independently of swinging motions of road arm 13 generated by terrain irregularities or vehicle speed changes. Thus, each wheel 11 is capable of movement in a vertical arc about swing axis 15 without interfering with the power transmission from shaft section 19a (or 17a) to axle 71. Swinging movement of the road wheel about swing axis 15 produces a torsional loading or unloading of elastomeric annulus 92. Each of the eight road wheels is provided with a drive-suspension unit of the type shown in FIG. 3.

If desired, selected ones of the road wheels can be made or converted into non-powered wheels, i.e., by removing or omitting one or more of the gears in the gear train (58, 60, 64, 81 and 73). Normally at least the two front wheels and the two rear wheels would be powered; the intermediate wheels might or might not be powered, as deemed necessary.

FEATURES OF THE INVENTION

The location of each annulus 92 inboard from the drive shaft 17 or 19 is considered unique. In such a location the annulus can be adequately sized with the proper diameters for its intended purpose. Preferably the annulus O.D. is relatively large, e.g. approximately 6 inches, for satisfactory deflection and low unit stress; the annulus I.D. may be approximately 2½ inches, sufficient to accommodate rod 94 without restricting annulus 92 deflection or imposing abnormal stress on the annulus.

The dimensional restraints imposed on the elastomeric annulus tend to preclude location of the annulus in close proximity to road arm 13, since drive sleeve 62 and gearing 58, 60 would interfere in the radial direction. Annulus 92 has approximately the same diameter as barrel 68. Location of each elastomeric annulus inboard from shafts 17 or 19 permits the annulus to have the proper diameters and axial length for satisfactory force-absorption. Each shaft 17 or 19 is located relatively close to the hull side wall in proper alignment with the respective gear box 42. Gear boxes 42 and steer unit 34 require lateral space; by keeping drive shafts 17 and 19 as far outboard as possible the take offs from the drive unit are somewhat simplified, i.e., the number of directional changes is minimized. Location of shafts 17 and 19 outboard from the vehicle centerline also provides vacant areas near the vehicle centerline for accommodation of such items as fuel tanks and batteries.

Preferably each shaft housing 44 and associated shaft devices 17, 19, 32, etc. define a drive line or plane located relatively close to the hull bottom wall, thereby lowering the vehicle silhouette and contributing to weight reduction. A low silhouette is particularly desirable when the vehicle is a military vehicle employed for scouting purposes.

The above advantages are obtained without sacrificing the strength or size of such components as annulus 92, torque rod 94, drive sleeve 62, barrel 68 or main bearing 86. Bearing 86 adequately handles both radial and axial loads. The load-carrying ability is due at least partly to the fact that the bearing has a relatively large diameter, e.g. in excess of six inches. The large diameter is made possible because the raceway surfaces are machined directly in the barrel and housing walls, i.e., there is no separate anti-friction assembly that would require radial wall thickness for attachment of the bearing assembly to the barrel and housing.

Figure 4:
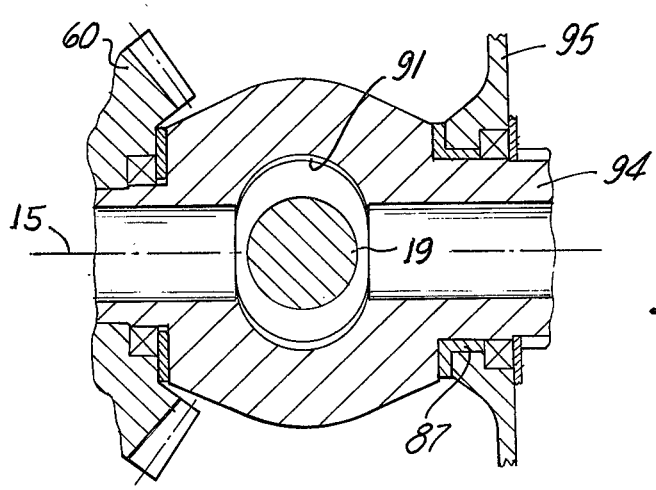
FIG. 4 is a fragmentary sectional view taken on line 4—4 in FIG. 3.

The construction of bearing 86 provides sufficient internal radial space for accommodation of drive sleeve 62 and torque 94. Due to its apertured nature (FIG. 4) the torque rod is enabled to function as a connection between annulus 92 and road arm 13. The thickened section of rod 94 (FIG. 4) is accommodated in a zone or space provided by the bevel gears 58 and 60. The rod uses otherwise vacant space.

Rod 94 can turn a considerable distance about its axis without interfering with the associated drive shaft 17 or 19. The road arm is thus capable of considerable travel, which is reflected in a smooth ride; the elastic annulus is chosen in accordance with permissible road arm travel and vehicle weight.

We claim:

1. In a wheeled vehicle having a hull; hull suspension means comprising a road wheel support arm connected to the hull on a swing axis; elastic force-absorption means centered on the swing axis inboard from the road wheel support arm; a torque rod interconnecting the road arm and the force-absorption means; said torque rod extending along the aforementioned swing axis so that it transmits road wheel forces to the force-absorption means; a rotary drive shaft disposed within the hull on an axis that intersects and crosses the aforementioned swing axis; and transmission means operatively interconnecting the drive shaft and road wheel; said torque rod having a clearance opening therethrough; said drive shaft extending through the clearance opening without interfering with rotational movement of the torque rod around the swing axis.

2. In the wheeled vehicle of claim 1 said road wheel support arm including a barrel extending into the hull on the swing axis; the force-absorption means comprising an elastomeric annulus whose outer diameter is substantially the same as that of the barrel.

3. In the wheeled vehicle of claim 2 the drive shaft having its axis located approximately midway between the barrel and the elastomeric annulus.

4. In the wheeled vehicle of claim 1 a housing carried by the hull for supporting the aforementioned drive shaft; said road wheel support arm comprising a barrel extending into the shaft support housing on the aforementioned swing axis; and a single anti-friction bearing means disposed within the shaft support housing to absorb both radial and thrust loads imposed on the barrel.

5. In the wheeled vehicle of claim 4 said anti-friction bearing means consisting of a single set of balls disposed within a raceway defined by grooves machined in opposed surfaces of the barrel and housing.

6. In the wheeled vehicle of claim 5 the shaft support housing having a ball loader opening communicating with the raceway.

7. In the wheeled vehicle of claim 1 the aforementioned transmission means comprising a sleeve surrounding the torque rod.

8. In the wheeled vehicle of claim 1 a housing carried by the hull for supporting the aforementioned drive shaft; said road wheel support arm including a rotary barrel extending into the shaft support housing on the aforementioned swing axis; the aforementioned transmission means comprising a drive sleeve arranged within the barrel in surrounding relation to the torque rod.

9. In a wheeled vehicle having a hull; road wheel support arms swingably connected to the right and left sides of the hull on individual swing axis; a separate elastic force-absorption means associated with each road wheel support arm; left and right drive shafts extending parallel to the vehicle longitudinal axis; each drive shaft being disposed within the hull on an axis that intersects and crosses the associated road wheel arm swing axis; drive trains in selected ones of the road wheel support arms; means for transmitting drive forces from the left drive shaft to individual drive trains in selected ones of the left road wheel support arms; means for transmitting drive forces from the right drive shaft to individual drive trains in selected ones of the right road wheel support arms; each drive-transmitting means comprising a drive sleeve concentric with the swing axis for the associated road wheel support arm; each force-absorption means comprising an elastomeric annulus located inboard of the associated drive shaft, and a torque rod extending along the swing axis from the elastomeric annulus to the associated road wheel support arm; each torque rod having a clearance opening therethrough, the associated drive shaft extending through the various clearance openings without interferring with rotational movements of the individual torque rods around the individual swing axis.

* * * * *